(12) United States Patent
Eckert

(10) Patent No.: US 10,602,685 B2
(45) Date of Patent: Mar. 31, 2020

(54) POLE AND WALL ADAPTABLE PLANT CONTAINER ASSEMBLY AND BRACKET

(71) Applicant: Karl Eckert, Sterling Heights, MI (US)

(72) Inventor: Karl Eckert, Sterling Heights, MI (US)

(73) Assignee: Eckert's Greenhouse, Inc., Sterling Heights, MI (US)

( * ) Notice: Subject to any disclaimer, the term of this patent is extended or adjusted under 35 U.S.C. 154(b) by 507 days.

(21) Appl. No.: 15/324,355

(22) PCT Filed: Jul. 22, 2015

(86) PCT No.: PCT/US2015/041476
§ 371 (c)(1),
(2) Date: Jan. 6, 2017

(87) PCT Pub. No.: WO2016/018689
PCT Pub. Date: Feb. 4, 2016

(65) Prior Publication Data
US 2017/0202161 A1    Jul. 20, 2017

Related U.S. Application Data

(60) Provisional application No. 62/031,968, filed on Aug. 1, 2014.

(51) Int. Cl.
*A01G 27/06* (2006.01)
*A01G 9/02* (2018.01)
(52) U.S. Cl.
CPC ............. *A01G 27/06* (2013.01); *A01G 9/028* (2013.01)

(58) Field of Classification Search
CPC ........ A01G 27/00; A01G 27/02; A01G 27/04; A01G 27/06; A01G 9/024; A01G 9/028; B65D 25/22; A47G 7/044
USPC ........ 220/475; 47/80, 81, 82; D11/143, 148, D11/152
See application file for complete search history.

(56) References Cited

U.S. PATENT DOCUMENTS

| | | |
|---|---|---|
| 1,499,473 A | 7/1924 | Price |
| 2,189,982 A | 2/1940 | Gustaf |
| 2,813,619 A | 11/1957 | Gerowin |
| 3,747,268 A | 7/1973 | Linder |
| 4,356,665 A | 11/1982 | Oliveira |
| D278,521 S | 4/1985 | Baird et al. |
| 4,708,256 A | 11/1987 | Intardonato |

(Continued)

*Primary Examiner* — Christopher D Hutchens
(74) *Attorney, Agent, or Firm* — Endurance Law Group PLC

(57) ABSTRACT

A planter assembly adaptable to a pole or a wall. The assembly holds a large amount of water for passively watering plants therein at an optimized rate without oversaturating the potting soil. The assembly comprises a shell and a soil insert and a plurality of wicking units. The soil insert is removably nested within the shell. A plurality of wicking units are selectively attachable to the bottom of the soil insert. The wicking units are hollow so that soil from the soil insert falls therein to absorb water from the reservoir in the shell. The wicking units are designed to provide stable support without consuming water volume or adding unnecessarily to the overall weight of the assembly. Overflow ports prevent oversaturation of the potting soil. A bracket can be used to clamp the assembly to a pole. An optional iron cladding basket is available.

15 Claims, 14 Drawing Sheets

(56) References Cited

U.S. PATENT DOCUMENTS

| | | | |
|---|---|---|---|
| 4,847,741 A * | 7/1989 | Boettinger | A01G 7/045 362/431 |
| 4,991,346 A * | 2/1991 | Costa, Jr. | A01G 27/04 47/79 |
| 5,042,197 A | 8/1991 | Pope | |
| 5,082,699 A | 1/1992 | Landau | |
| 5,269,095 A * | 12/1993 | Helfman | A47G 7/044 47/39 |
| 5,294,012 A * | 3/1994 | Shott | B65F 1/0066 220/23.4 |
| D383,417 S | 9/1997 | Davis | |
| D386,114 S | 11/1997 | Carson | |
| 5,960,587 A * | 10/1999 | Brasseur, Jr. | A01G 9/02 47/66.1 |
| 5,967,359 A | 10/1999 | Mindell | |
| D416,214 S | 11/1999 | Conner | |
| 6,085,459 A | 7/2000 | Conner | |
| 6,125,579 A | 10/2000 | Pavelka | |
| 6,131,334 A | 10/2000 | Fan | |
| 6,161,333 A | 12/2000 | Poston | |
| 6,298,600 B1 | 10/2001 | Feldman | |
| 6,370,819 B1 | 4/2002 | Reiss et al. | |
| 6,381,902 B1 | 5/2002 | Batshon | |
| 6,584,730 B1 | 7/2003 | Mai | |
| 6,615,543 B1 * | 9/2003 | Palsrok | A01G 9/022 47/86 |
| D492,617 S | 7/2004 | Axworthy | |
| 6,964,129 B2 | 11/2005 | Fenwick | |
| 6,986,224 B2 | 1/2006 | Gelfer | |
| 7,036,273 B2 * | 5/2006 | Valiquette | A01G 7/06 47/64 |
| 7,685,765 B2 | 3/2010 | Stevenson | |
| 7,730,666 B2 | 6/2010 | Spray | |
| 7,797,880 B1 * | 9/2010 | Kamau | A01G 9/02 47/66.1 |
| 7,837,165 B2 * | 11/2010 | Stone | A47G 7/044 224/414 |
| D632,209 S | 2/2011 | Sheaffer et al. | |
| 7,958,671 B2 | 6/2011 | Sheaffer et al. | |
| D641,653 S | 7/2011 | Gregson et al. | |
| 8,065,834 B2 | 11/2011 | Eckert | |
| 8,146,292 B2 | 4/2012 | Brandstätter | |
| 8,347,552 B1 | 1/2013 | Johnson | |
| D675,492 S * | 2/2013 | Art | D32/54 |
| 8,510,988 B2 | 8/2013 | Anderson et al. | |
| 8,656,641 B2 | 2/2014 | Rhoads et al. | |
| 2003/0196376 A1 * | 10/2003 | Taylor | A01G 9/023 47/66.6 |
| 2005/0102900 A1 * | 5/2005 | Valiquette | A01G 7/06 47/79 |
| 2010/0077661 A1 * | 4/2010 | Brandstatter | A01G 27/02 47/80 |
| 2010/0142193 A1 * | 6/2010 | Stone | A01G 9/02 362/154 |
| 2010/0162624 A1 | 7/2010 | Bradley | |
| 2010/0218422 A1 * | 9/2010 | Eckert | A01G 9/028 47/65.6 |
| 2011/0162272 A1 | 7/2011 | Junkeer | |
| 2012/0000127 A1 * | 1/2012 | Liu | A01G 9/02 47/66.1 |
| 2013/0067812 A1 | 3/2013 | Masters | |
| 2014/0182202 A1 * | 7/2014 | Wilmot | A01G 27/04 47/81 |
| 2015/0040471 A1 * | 2/2015 | Hooper | A01G 27/04 47/48.5 |

* cited by examiner

POLE AND WALL ADAPTABLE PLANT CONTAINER ASSEMBLY AND BRACKET

CROSS-REFERENCE TO RELATED APPLICATIONS

This application claims priority to U.S. Provisional Patent Application No. 62/031,968 filed Aug. 1, 2014, the entire disclosure of which is hereby incorporated by reference and relied upon.

BACKGROUND OF THE INVENTION

Field of the Invention

This invention relates generally to plant containers, and more specifically to plant containers which include a passive self-watering function and that can be mounted at an elevated location on a pole or wall.

Description of Related Art

Municipalities, businesses and institutions often utilize potted plantings in common/public areas for decorative effect. These potted plantings are typically comprised of soil and flowers placed in containers that may be set on the ground, attached to a wall or hung basket-like. A municipality, business or institution will typically invest large sums of money in such beautification efforts, and therefore there is a keen desire to see the plants looking healthy and attractive. To maintain proper plant health, the correct amount of water is consistently needed over the growing season. Too little water can result in plant death, whereas too much water can over-saturate the soil and also result in plant death. When a large number of potted plantings are deployed, the regular need for watering can impose a substantial labor burden on gardener/caretaker services.

U.S. Pat. No. 8,065,834 issued Nov. 29, 2011 to Eckert, Applicant of this present invention, discloses a plant container configured with a large internal water reservoir that is isolated from the soil to prevent saturation of the soil. According to this patented invention, a caretaker is able to add large amounts of water that are sufficient to sustain the plants over a relatively long period of time without over-saturating the soil. The entire disclosure of U.S. Pat. No. 8,065,834 is hereby incorporated by reference and relied upon.

In some instances, it is desirable to associate a potted planting with a vertical shaft, such as a light pole. In the past, there were typically two ways this could be accomplished: 1) to affix an angle bracket to the pole that could be used to suspend the plant container using chains or ropes; and 2) set the plant container on the ground adjacent the pole base. In the case of the bracket with hanging plant container, it is common to hang a pair of diametrically-opposed plant containers (somewhat akin to a traditional balance scale) in order to provide balance to the pole as well as a more symmetrical appearance. This requirement to provide two plant containers for each pole can impose decorative constraints, added costs and added maintenance burdens to the caretaker.

Moreover, the existing method of suspending a plant container using a chains or wires or ropes can be occasionally unstable when the plant container is severely swayed due to a heavy wind, for example. This can be a particular concern in public pedestrian areas where spilled soil and plants could create a potential for injury, or even worst if the plant container falls into the path of motor vehicles.

Examples of prior art plant containers include U.S. Pat. No. 4,991,346 to Jose, issued Feb. 12, 1991. This patent discloses a plant container assembly for holding a soil insert with a single centered wicking unit to supply water to the potting soil and plants. U.S. Pat. No. 6,986,224 to Aharon, issued Jan. 17, 2006, discloses a plant wetting method and apparatus comprising an outer shell, a soil insert, and a single centered wicking unit. U.S. Pat. No. 6,370,819 to Steven, issued Apr. 16, 2002, teaches a plant watering system comprising an outer shell, a soil insert, and monolithic wicking units. U.S. Pat. No. 6,584,730 to Mai, issued Jul. 1, 2003, teaches a flowerpot having an outer shell and a soil insert with non-detachable wicking units. And U.S. Pat. No. 3,747,268 to Linder, issued Jul. 24, 1973, discloses a pair of half-containers for plants to attached to a pole or post.

These prior art examples provide evidence of the general level of interest that exists for solutions in the potted plant field, yet here remains a need for an improved plant container for pole, and in particular light pole, applications that can be used without imposing aesthetic asymmetry or weight imbalance to a supporting pole, is more securely stable than prior art hanging systems, and that is capable of holding a large amount of water and delivering that water to the plant at an optimized rate without over-saturating the soil. Such an improved plant container should also be versatile enough to permit non-pole elevated mounting applications with little-to-no modifications.

BRIEF SUMMARY OF THE INVENTION

A plant container assembly of this invention comprises a shell and a soil insert and a plurality of wicking units. The shell forms an outer receptacle for the assembly and houses an internal water reservoir. The shell also has a front wall and a back wall and a bottom. The back wall includes a pair of abutment sections separated by a semi-cylindrical indentation. Each of the abutment sections includes at least one fastener adapted to connect to an adjacent structure. The soil insert is removably nested within the shell, and forms an interior receptacle for soil (i.e., earth). The open top of the soil insert substantially fills the open top of the shell. The soil insert has an anterior wall and a posterior wall and a permeable floor. The posterior wall includes a pair of co-planar sections separated by a semi-cylindrical bulge. The permeable floor includes a plurality of wicking attachments. Each wicking attachment surrounds a soil hole. A wicking unit is selectively attachable to each wicking attachment. The wicking units each have a mounting flange surrounding an opening that is aligned with the soil hole in the soil insert so as to permit the passage of loose soil therethrough. A generally conical body of the wicking unit extends downwardly from the mounting flange to an apical tip, and is surrounded by a plurality of external ribs.

The novel wicking units of this invention provide sturdy structural support for the soil insert which is often heavy with water-laden soil and plants. The wicking units are configured to passively draw water from the reservoir in the shell, and percolate that water upwardly into the roots of the plants growing in the soil insert. The design of the wicking units provides several advantages, which include a more stable support system for the soil insert. That is to say, the external ribs enable each wicking unit to stably support the weight of the soil insert with the potting soil and plants by extending and distribution the weight load over a broader area than would be otherwise possible. Additional benefits afforded by the external ribs include maximizing the available water reservoir space, and reducing the overall weight of the assembly.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Referring to the figures, wherein like numerals indicate like or corresponding parts throughout the several views, a plant container assembly according to one exemplary embodiment of this invention is generally shown at 20. The assembly 20 is particularly configured for municipal, business and institutional settings wherein mounting to a pole or wall is desired. In use, the assembly 20 may be set on the ground, secured to column-like vertical support shaft, such as a light pole 22, or mounted to a vertical surface like a wall with little-to-no modifications, as will be described below. In regards to pole 22 mounting options, the assembly 20 can be placed at the bottom of the pole 22 directly on the ground, as depicted in phantom in FIG. 1, or positioned at any desired height along the pole 22 using a novel bracket feature that will be described subsequently. Pole mount settings, and in particular light pole 22 applications like that shown in FIG. 1, can be implemented using two assemblies 20 paired in back-to-back fashion with the light pole 22 trapped therebetween. As such, a paired set of assemblies 20 create an aesthetic symmetry and weight balance to the supporting pole 22. And using the novel bracket system of this invention, the assemblies 20 will be more securely stable than comparable prior art hanging basket systems. Additionally, the assembly 20 is capable of holding a large amount of water and delivering that water to plants therein at an optimized rate without over-saturating the soil.

Figure 1:
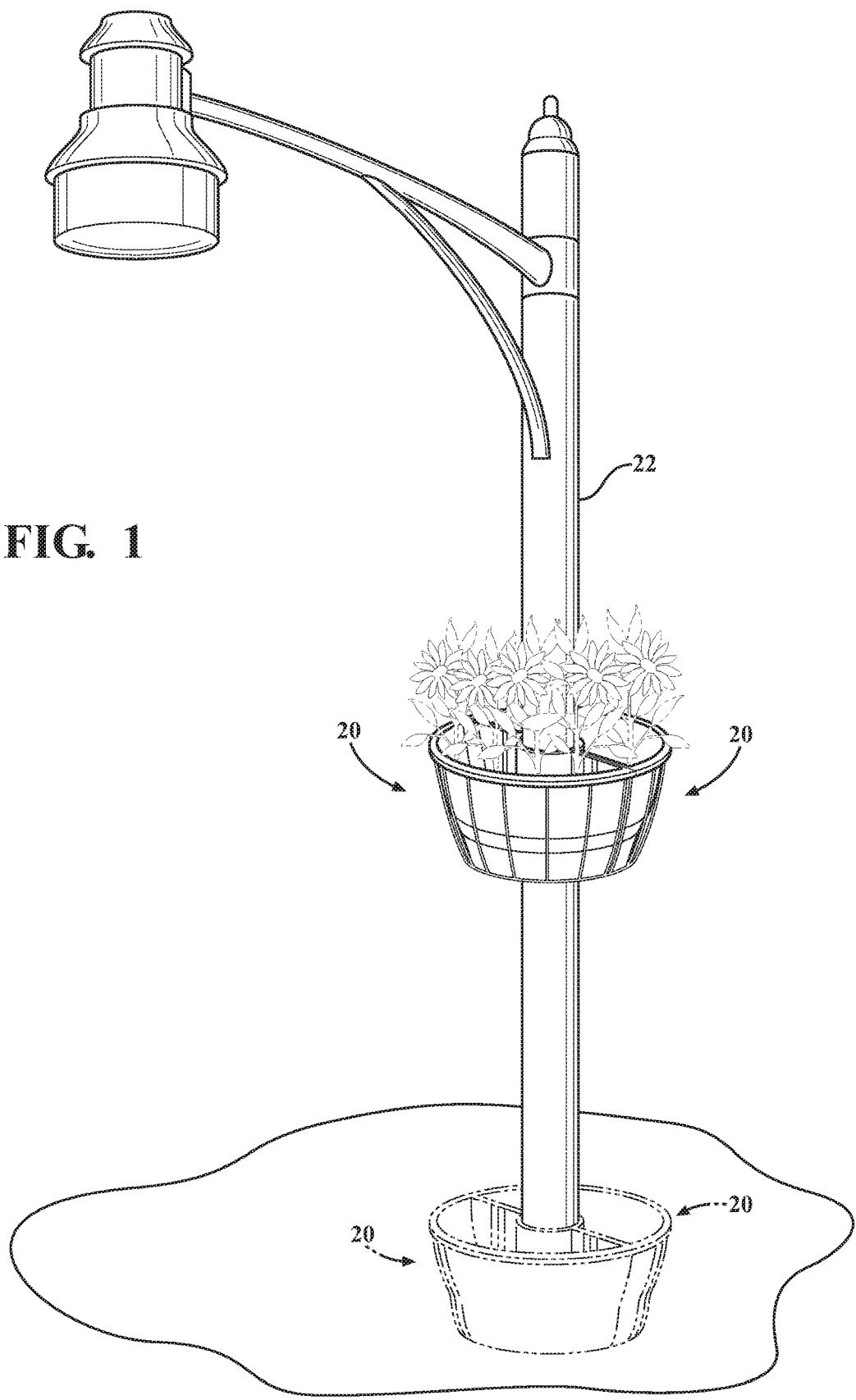
FIG. 1 is an environmental view showing a pair of planter assemblies according to one exemplary embodiment of this invention with optional cladding baskets supported at an elevated position on a light pole, and with a phantom line view showing an optional ground placement surrounding the same light pole.
Figure 2:
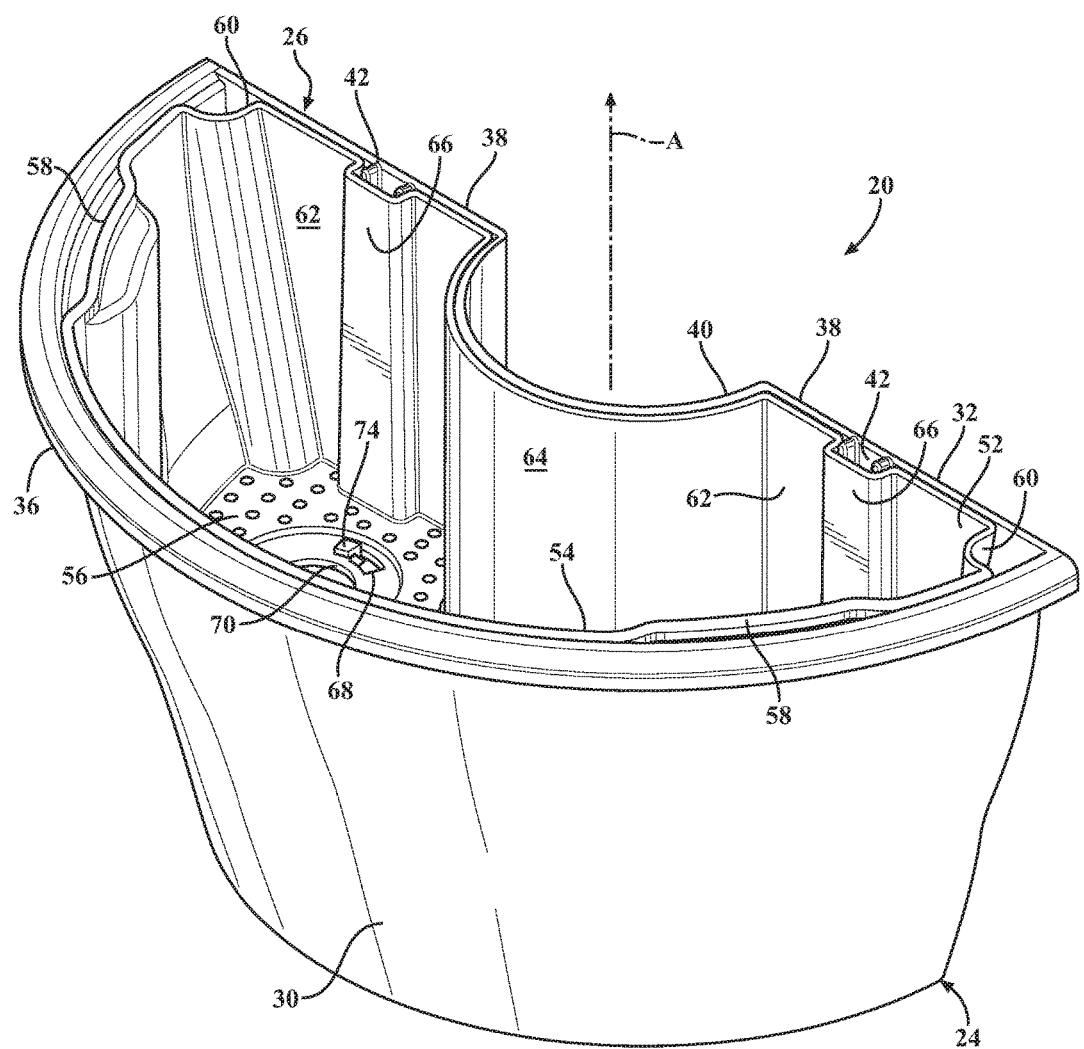
FIG. 2 is a perspective view of a planter assembly according to the exemplary embodiment of this invention.
Figure 3:
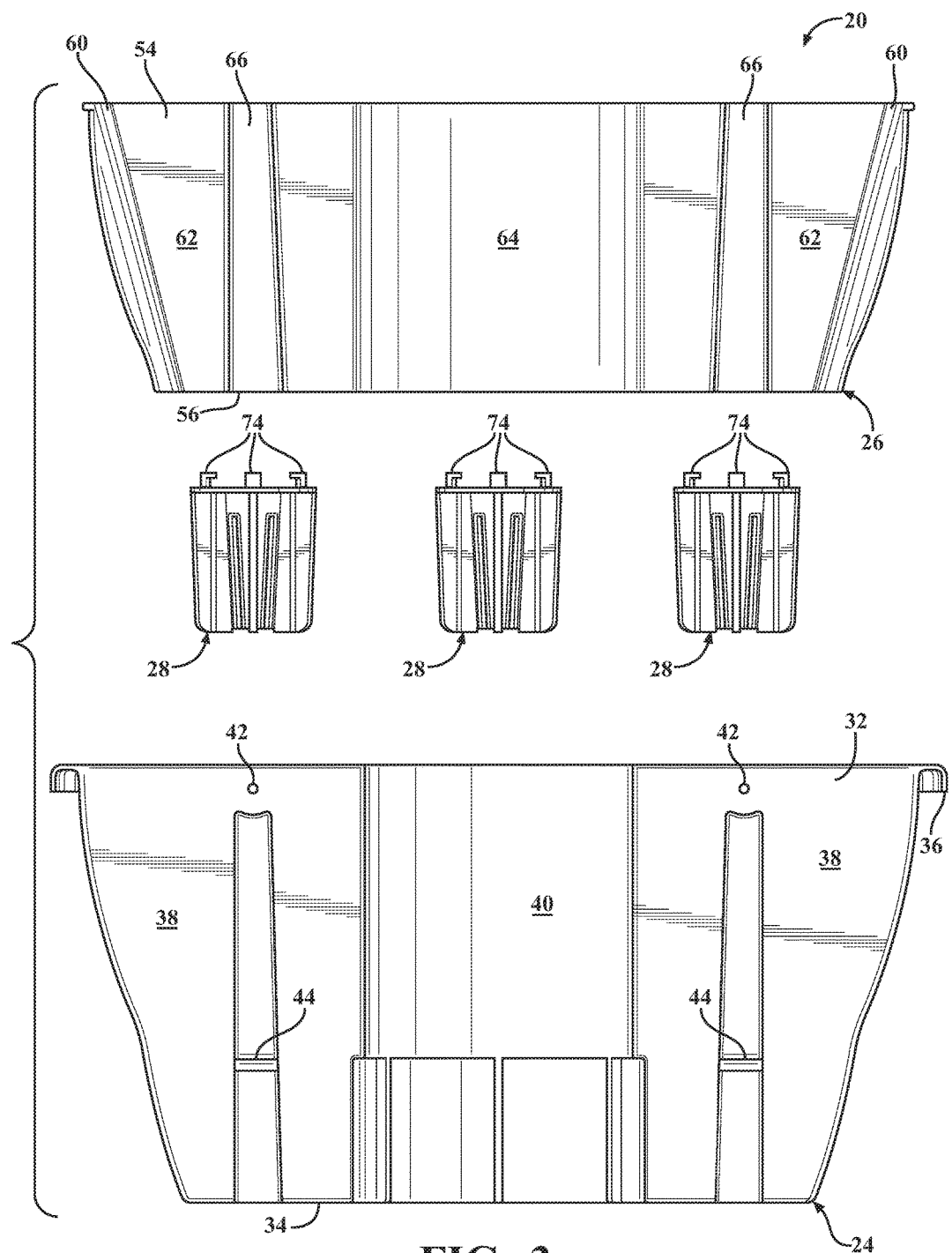
FIG. 3 is a rear elevation view of the planter assembly of FIG. 2 and showing the components in exploded fashion.
Figure 7:
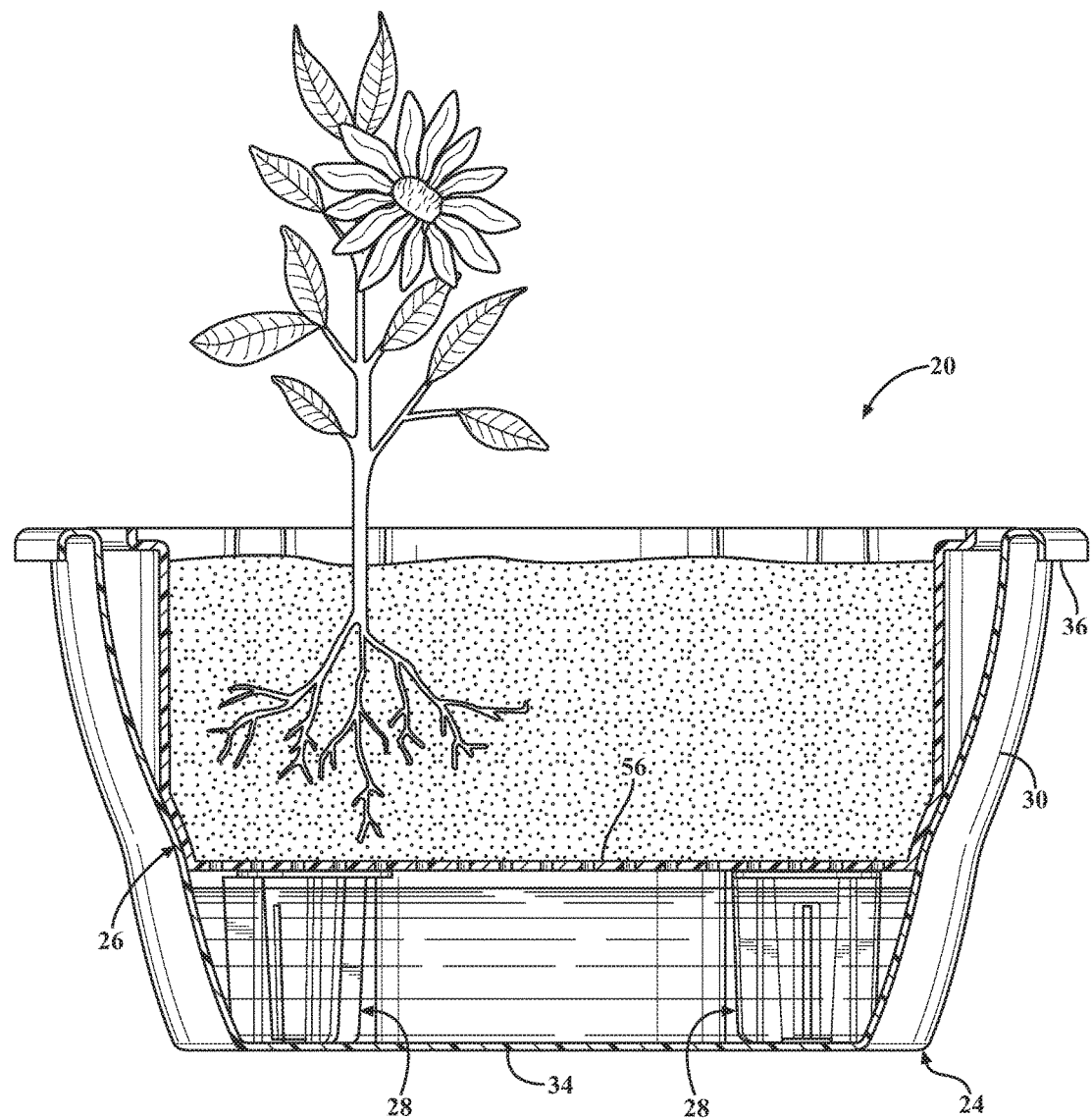
FIG. 7 is a cross-section view of the planter assembly of FIG. 2 as in use with the soil insert filled with soil and a growing plant and the shell containing a body of water in a reservoir area thereof.

Turning now to FIGS. 2-6, the main components of the assembly 20 include an outer shell 24, an inner soil insert 26 and one or more wicking units 28. In use, potting soil is placed inside the soil insert 26 and decorative plants (or other desired vegetation) are planted therein as shown in FIGS. 1 and 7. The soil insert 26 is placed inside the shell 24 which is larger and shaped to hold a volume of water in reservoir below the soil insert to be used to self-water the plants. The wicking units 28 passively draw water from the reservoir area of the shell 24 into the soil contained within the soil insert 26. Each of these main components will be described first in detail and then subsequently in combination and finally use as a plant container. Thereafter, certain optional yet highly practical features will be described. In FIG. 2, the outer shell 24, inner soil insert 26 and wicking units 28 (not visible) are shown in assembled form comprising the plant container assembly 20 of this present invention as represented in one exemplary form. Naturally, many stylistic variations are possible without departing from the functional attributes of this invention. In FIG. 3, these same components 24-28 are depicted in exploded form.

The shell 24 forms an outer receptacle for the assembly 20. The shell 24 is of a cup-like construction having an open top into which the other main components (i.e., soil insert 26 and wicking units 28) are placed. In the illustrated embodiment, the shell 24 has a front wall 30 and a back wall 32 and a bottom 34. The front wall 30 may be stylized to achieve any desired architectural effect. In the illustrated example of FIG. 2, the front wall 30 has a generally smooth, tapered semi-cylindrical shape giving the appearance of one-half of a traditional planting pot. The front wall 30 is generally centered about an imaginary vertical axis A. The uppermost edge of the front wall 30 may be formed with a generally semi-circular roll-over lip 36 to provide a convenient gripping rim as well as a gentle outer edge that is not prone to causing scrapes or injuries when accidently bumped by a person.

Figure 5:
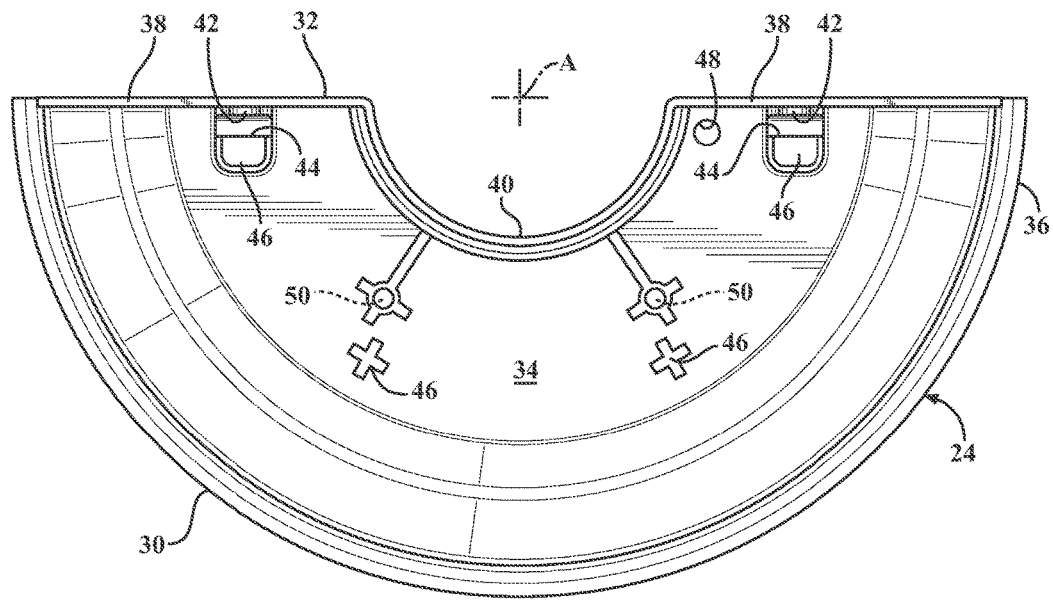
FIG. 5 is top view of the shell.
Figure 6:
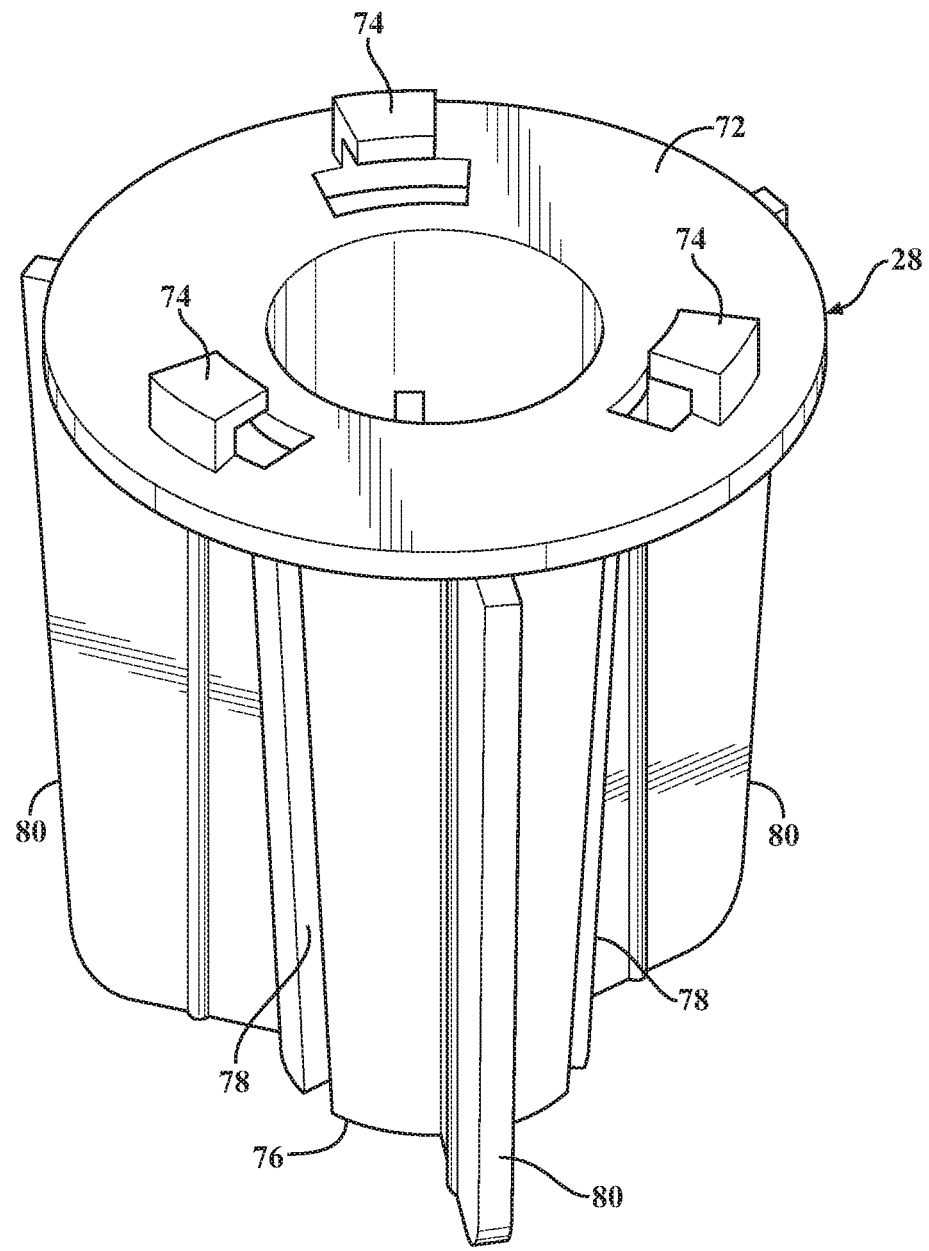
FIG. 6 is a perspective view of the wicking unit.

The back wall 32 of the shell 24 is perhaps best shown as an elevation in FIG. 3 as well as in the top view of FIG. 5. The back wall 32 is formed by a pair of abutment sections 38 that are disposed in a common plane that generally bisects the vertical axis A. The abutment sections 38 are spaced apart from one another, on opposite sides of a centrally-located semi-cylindrical indentation 40. That is to say, the indentation 40 is in-between the abutment sections 38, and is arranged in a vertical direction so as to nest against a light pole 22 when implemented in that mounting option. The semi-cylindrical indentation 40 is therefore preferably centered about the vertical axis A and helps to perfectly center the assembly about the vertical axis of the pole 22.

Each of the abutment sections 38 includes at least one fastener 42 adapted to connect to an adjacent structure. The adjacent structure can be any desired physical element, including a vertical wall (not shown) or a cladding basket like that shown in FIGS. 16-17. In practice, a common utilization of the fasteners 42 is to couple two identical assemblies 20 to one another in back-to-back fashion like that shown in FIGS. 9-11. The fasteners 42 can take many different forms. For one example, the fasteners 42 can be simple hook-like features as described in the priority provisional patent application U.S. Ser. No. 62/031,968 which has been fully incorporated herein by reference. However, in the illustrated examples, the fasteners 42 comprise threaded bolt and nut features as perhaps best shown in FIG. 11. The bolts pass through reinforced holes in the back wall 32. The holes (of fastener 42) are easily seen in FIG. 3.

Figure 16:
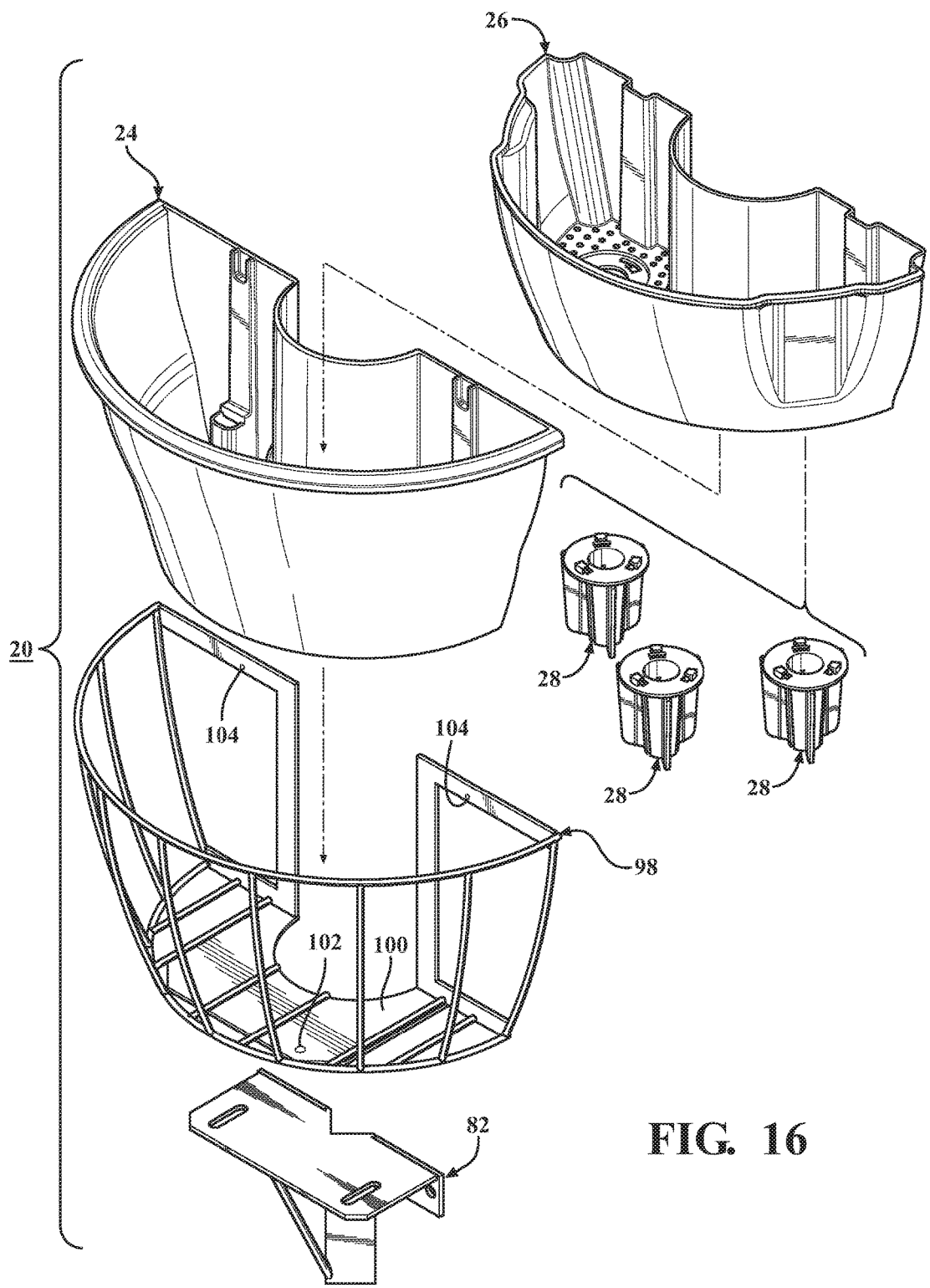
FIG. 16 is an exploded view showing the planter assembly in combination with the optional bract and cladding basket features.

The back wall 32 may be configured to include at least one overflow port 44. In the illustrated examples, two overflow ports 44 are provided—one in each abutment section 38 located directly below the respective holes of the fasteners 42. However, other placements of the one or more overflow ports 44 are certainly possible. The overflow port 44 has an opening that is disposed above the bottom 34 by a predetermined distance to automatically discharge any water contained in the shell 24 that is above the overflow port 44. That is to say, the assembly 20 is designed to hold a maximum about of water in reservoir. Any water in excess of the design volume could threaten the health of the potted plants, and is therefore automatically discharged under the influence of natural gravitational flow through the one or more overflow parts 44. The overflow ports 44 are best seen in FIGS. 5 and 16.

Figure 13:
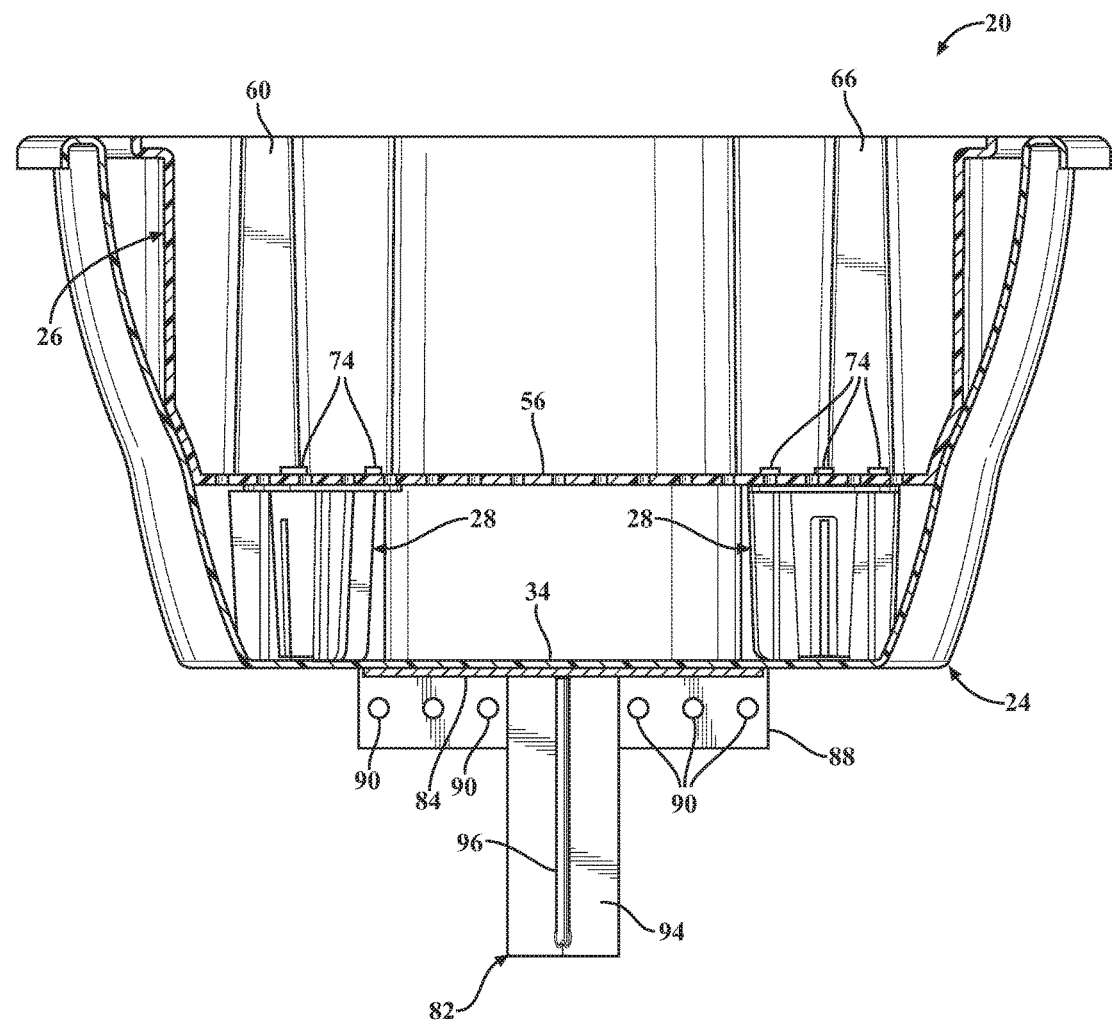
FIG. 13 is a cross-sectional view taken generally along lines 13-13 of FIG. 10.
Figure 14:
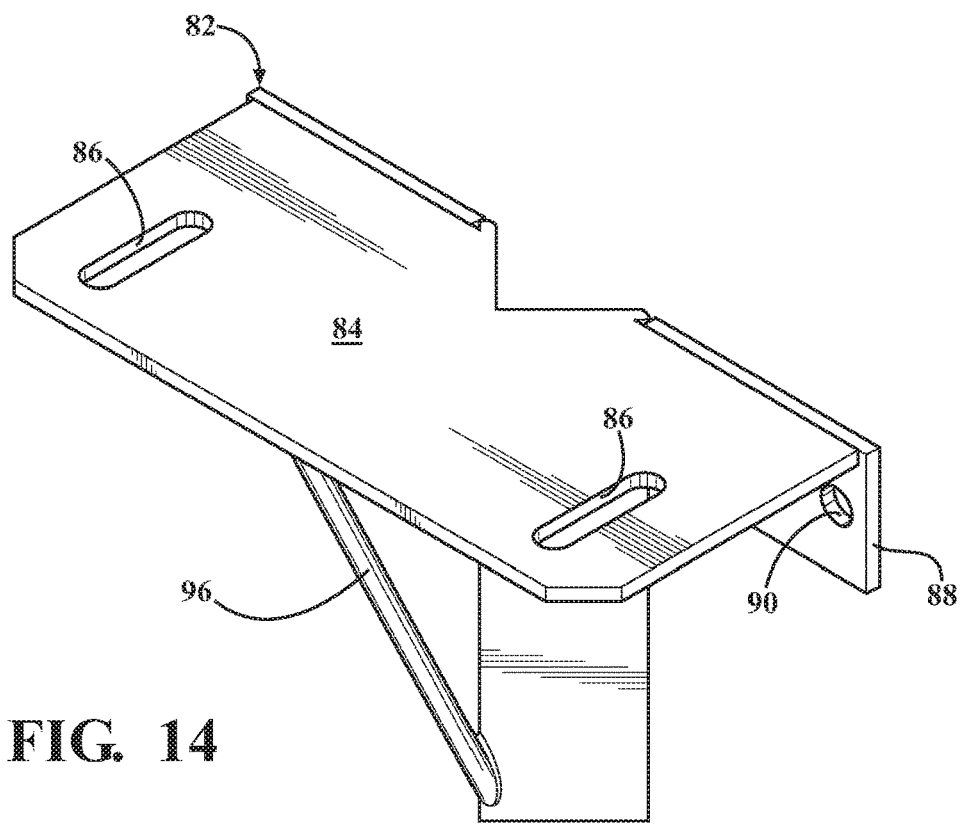
FIG. 14 is a perspective view of the bracket.
Figure 15:
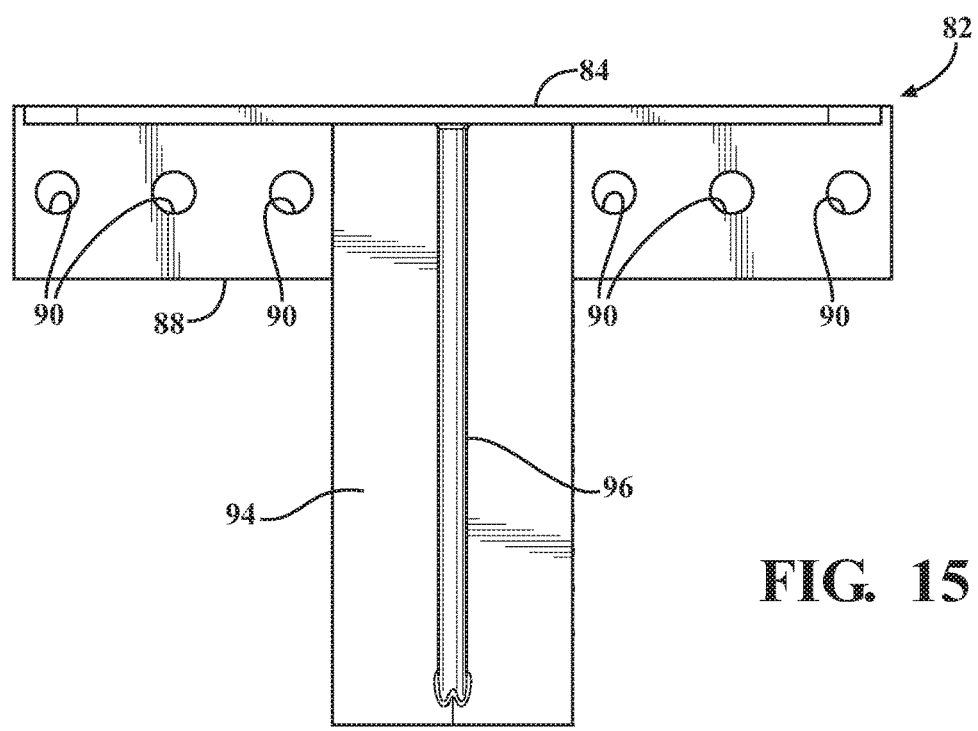
FIG. 15 is a front elevation of the bracket.

A plurality of interior support pads 46 are arranged within the shell 24 for the purpose of supporting the soil insert 26 at a stable, common elevation above the bottom 34. The common elevation at which the soil insert is maintained by the support pads 46 is above the overflow port 44. That is to say, the interior support pads 46 hold the soil insert 26 above the level of the overflow ports 44 so that the maximum level of water in reservoir in the shell 24 is below the soil insert 26. The interior support pads 46 include at least one ledge extending inwardly from the back wall 32. In the example provided, ledges are provided directly above each overflow port 44 and also arcuately along the interior surface of the semi-cylindrical indentation 40 as shown in FIG. 5. The interior support pads 46 also include at least one column extending upwardly from the bottom 34 of the shell 24. In FIG. 5, there are two such columns shown, each in the form of a plus sign (+), indicating that the columns may have a "+" shaped cross-section for structural integrity. These columns are also visible in elevation in FIG. 13. The tops of the columns are aligned horizontally with the several ledges on the back wall 32, and together these co-planar surfaces form the interior support pads 46.

The bottom 34 may be formed in a semi-annulus shape, as shown in FIG. 5, so as to close the bottom of the shell 24 below the front 30 and back 32 walls and thereby establish a reservoir volume to hold water for nourishing plants that are grown in the soil inert 26. A drain hole 48 can be placed in the bottom 34 to permit the complete and rapid evacuation of water from the shell 24. A drain hole 48 is shown in FIG. 5, and can be stopped with a removable plug (not shown) that is accessible from the exterior underside of the shell 24. The exterior underside of the bottom 34 also includes a least one connector fitting 50. The connector fitting opens downwardly from the shell 24 to allow attachment to a bracket and/or cladding basket as will be described subsequently. In the illustrated embodiment, two connector fittings 50 are provided, one adjacent each of the column features of the interior support pads 46. The connector fittings 50 may be insert-molded nuts configured to accept the threads of a bolt (not shown).

As mentioned previously, the soil insert 26 is removably nested within the shell 24, and forms an interior receptacle for soil (earth) and growing plants. The soil insert 26 has an open top that substantially fills the open top of the shell 24 as shown in FIG. 2. The soil insert 26 includes an anterior wall 52 and a posterior wall 54 and a water-permeable floor 56. The anterior wall 52 is preferably convex with a generally tapered semi-cylindrical shape to match, more or less, the interior shape of the front wall 30 of the shell 24. When the soil insert 26 is assembled in the shell 24, the anterior wall 52 is generally centered about the vertical axis A. At least one hand-grip 58 may be formed on the uppermost edge of the anterior wall 52 to facilitate removal of the soil insert 24. The embodiment shown in the figures is fitted with two hand-grips 58. These hand-grips 58 are sufficiently inset from the front wall 30 of the shell 24 so that a person can easily reach their fingers in-between the two members when attempting to lift out the soil insert 26. The anterior wall 52 may further include at least one filler relief 60. The filler relief 60 establishes a path or conduit-like passage for water to be filled directly into the shell 24 and thereby by-pass the soil inert 26. A service attendant can insert the tip of a water supply hose into the filler relief 60, and thus fill water into the reservoir area of the shell 24. The example of FIG. 2 shows two such filler relief features 60 disposed at the intersections (i.e., corners) between the anterior wall 52 and the posterior wall 54. Of course, other locations are possible.

Figure 4:
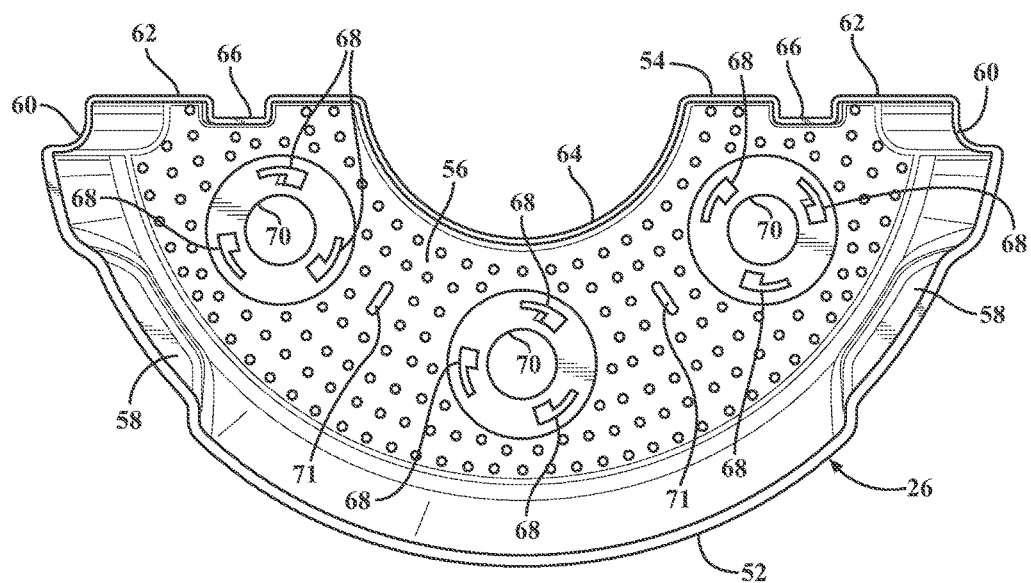
FIG. 4 is a top view of the soil insert.

The posterior wall 54 of the soil insert 26 is shown in elevation in FIG. 3 and in top view in FIG. 4. The posterior wall 54 is composed of a pair of co-planar sections 62 separated by a semi-cylindrical vertical bulge 64 so as to snuggly nest along the back wall of the shell 24 as shown in FIG. 2. The co-planar sections 62 are thus disposed adjacent respective abutment sections 38 within the shell 24, and the bulge 64 is likewise form-fit about the semi-cylindrical indentation 40. Vertically running channels 66 in each co-planar section 62 overlap the fastener features 42 in the back wall 32 of the shell so as to provide sliding clearance for insertion and removal of the soil insert 26.

The permeable floor 56 has a semi-annulus shape to accommodate the shape of the assembly 20. The permeable floor 56 is configured to rest directly on the interior support pads 46 of the shell 24 as discussed previously. Water permeability is accomplished by an array of tiny holes as best shown in FIGS. 4 and 7. Water entering the soil insert 26 in sufficient quantities from above, such as by human-initiated watering or rainfall, will percolate through the soil and drain through the tiny holes into the reservoir area of the shell 24. This is, in fact, an alternate way to fill the reservoir with water. Rather than adding water through the filler relief 60, an attendant can add water directly to the soil in the soil insert until water runs out the overflow ports 44.

The permeable floor 56 includes a plurality of wicking attachments 68, as perhaps best shown in FIG. 4. Each wicking attachment 68 surrounds a soil hole 70. The wicking attachments 68 can take a variety of shapes, but in one preferred implementation they are comprised of a portion of a rotary coupling, and in particular the female portion of a rotary coupling. One or more elongated slots 71 may optionally be provided in the permeable floor 56 to receive traditional cloth wicks (not shown) that will dangle down into the reservoir to further draw water into soil contained in the soil insert 26.

A wicking unit 28 is selectively attachable to each wicking attachment 68. The wicking units 28 each have a mounting flange 72, upon which is carried a mating portion 74 adapted to interlock with the rotary coupling of the wicking attachment 68. In the illustrated example, male lugs 74 with hook-like legs are configured to mate with the corresponding female features of the wicking attachments 68 with a twist-lock motion. In this manner, the wicking units 28 can be easily coupled and uncoupled to the bottoms of the soil inserts 26, where they stand submerged in water contained in the reservoir portion of the shell 24.

Returning again to FIG. 4, the mounting flange 72 is shown having a central opening therein that is aligned with the soil hole 70 when the wicking unit 28 is coupled to the soil insert 26. The central opening in the mounting flange 72 permits loose soil from the soil insert 26 to pass into the wicking unit 28. The wicking units 28 have a generally conical body that extends downwardly from the mounting flange 72 to a flattened or truncated apical tip 76. The body of each wicking unit 28 includes at least one, but preferably a plurality, of axially propagating slits 78 that are permeable to water but are narrow enough to be generally resistant to loose soil transit. The slits preferably extend from the apical tip 76 to a termination point just below the mounting flange 72. In this manner, the slits 78 present a narrow, continuous gap that extends in excess of 50% of the overall vertical height of the wicking unit 28, and even more preferably in excess of 75%. In one exemplary embodiment, the overall vertical height of the wicking unit 28 is 4.5 inches, and the axial length of the slits 78 is 3.5 inches, or about 78%.

Figure 8:
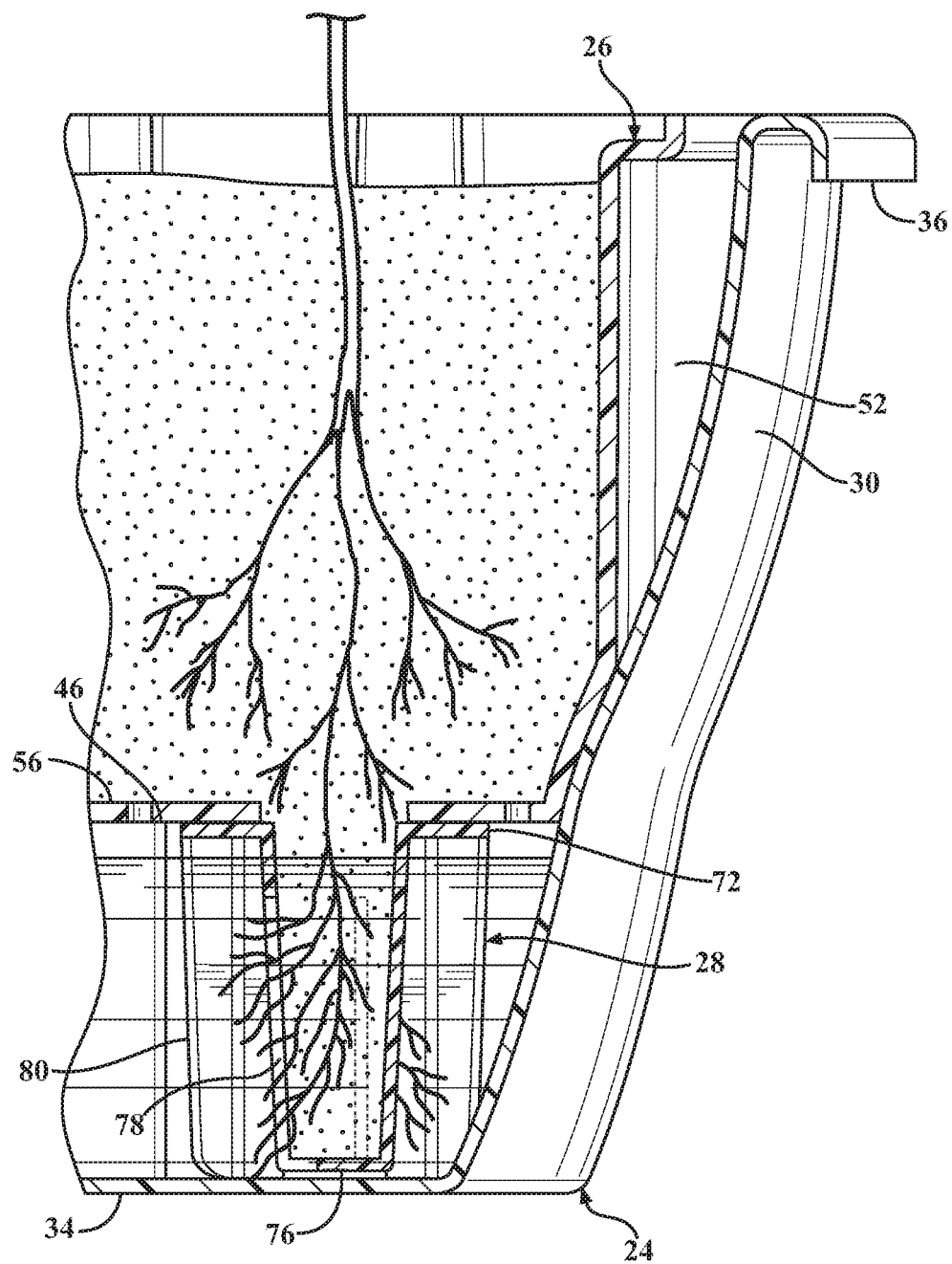
FIG. 8 is a fragmentary cross-sectional view taken through a wicking unit as in use to illustrate the potential for plant roots to propagate into the hollow conical body of a wicking unit which is filled with potting soil.

The apical tip 76 may be perforated to further facilitate water access to soil within the body of the wicking units 28. In use, the wicking units 28 are submerged (at least partially) in water residing in the reservoir region of the shell, as shown in FIGS. 7 and 8. The surrounding water enters the body of the wicking units 28 through the slits 78 and/or perforations in the apical tip 76 where it is absorbed by soil in the wicking unit 28 that has fallen through the soil hole 70. Through capillary and/or other natural actions, the water is transported via the soil up through the wicking units 28 and into the soil insert 26 where the water directly nourishes the plants therein. Roots in the plant may grow relatively unimpeded into the body of the wicking units 28 as shown in FIG. 8 to better access the water. Moreover, the long and uninterrupted gaps created by the slits 78 will accelerate the growth of strong and healthy roots, which in turn affect the overall vitality of the plant organism. This is due to the fact that when provided sufficient clearance, roots will naturally cluster and grow thick as they propagate toward a water source. As the root system grows, its secondary and tertiary branches, which play an important role in supplying nutrients and water to the plant organism, will readily exit the wicking units 28 through the slits 78 and immerse themselves within the water reservoir. This growth is accentuated by the protracted and continuous openings created by the slits 78 which initially attract the roots by the prodigious wetting that occurs through the soil inside the wicking units 28. Furthermore, as the branches in the root system split and thicken by growing through the long narrow slits 78, loose soil inside the body of the wicking unit 28 is restrained from falling through the slits 78. In other words, the novel shape of the slits 78 causes the root system to grow quickly therethrough into the water reservoir, and thus progressively discourages the soil from spilling into the reservoir.

Each wicking unit 28 includes at least one, but preferably a plurality, of external ribs 80 as shown in FIG. 8. The ribs 80 may be disposed in equal circumferential increments about the body. In the illustrated example, three ribs 80 are provided and each is circumferentially offset from the others by about 120 degrees, and likewise three slits 78 are also provided and each is circumferentially offset from the others by about 120 degrees. Each slit 78 is disposed between two adjacent external ribs 80 so that the ribs 80 and the slits 78 alternate circumferentially about the conical body of the wicking unit 28. Other configurations are of course possible. Each rib 80 extends from the mounting flange 72 to a terminal point past the apical tip 76. Preferably, the vertical extent of the ribs 80 are designed to coincide precisely with distance to the inside bottom 34 of the shell 24 so that the ribs 80 can be used as structural members to support the weight of the soil insert 26, thereby relieving that burden from the conical body of the wicking units 28.

Close examination of FIG. 8 will reveal that the overextended lengths of the external ribs 80 allow the apical tip 76 to reside some small but relevant distance above the bottom 34 of the shell 24. As such, water in the reservoir is permitted to circulate underneath the apical tips 76. Each rib 80 is preferably as wide as possible to provide the maximum column strength. For example, the radially outermost edge of each rib 80 may extend beyond the mounting flange 72 a short distance as visible in FIG. 6. The external ribs 80 allow the conical body of the wicking units 28 to be designed for maximum water transfer capability (primarily via slits 78) rather than for column strength. That is to say, the weight-loading capacity of the conical bodies are significantly diminished by the elongated slits 78, yet the soil insert 26 is still adequately supported from below because the external ribs 80 carry the vertical loading burden for the wicking units. In addition to this advantage of providing stable support, the external ribs 80 are also beneficial to maximize the available water reservoir space inside the shell 24. More specifically, the external ribs 80 are relatively thin and therefore occupy relatively little volume. As such, they are optimally designed to consume very little water reservoir space by allowing the volume of the wicking units 28 to be made smaller. In other words, the conical bodies of the wicking units 28 do not have to be designed large for column strength to support the heavy soil insert. Furthermore, the external ribs 80 are helpful in reducing the overall weight of the plant container. Weight reduction in this instance is accomplished by reducing the volume of the hollow conical body portion of the wicking units 28, which in turn reduces the weight of the assembly 20 in that less potting soil fills the wicking units 28. A lighter assembly 20 is of course preferred over a heavy one when contemplating elevated mounting applications such as on a pole 22 or a wall (not shown).

Figure 9:
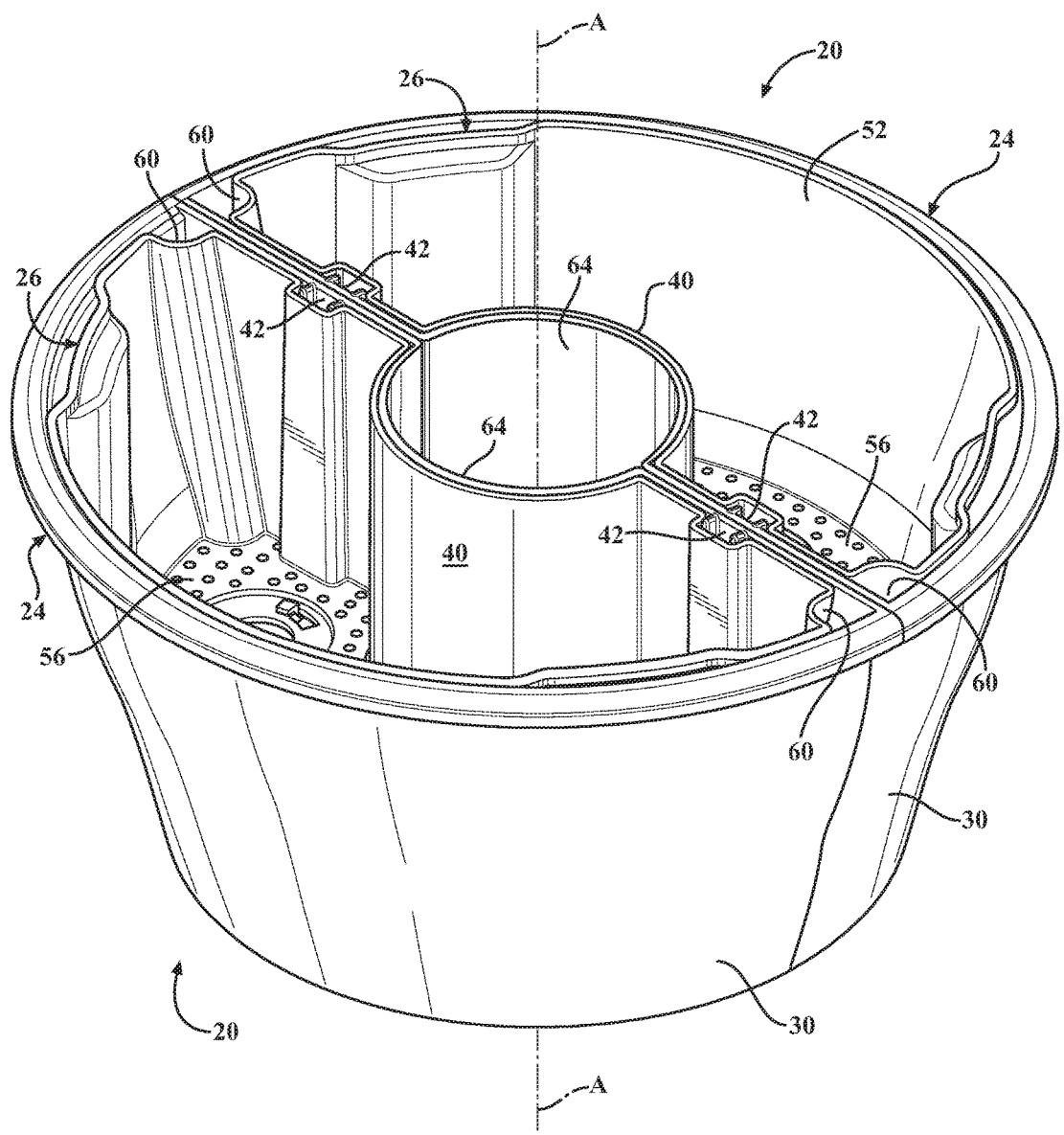
FIG. 9 is a perspective view showing two identical planter assemblies attached back-to-back.
Figure 10:
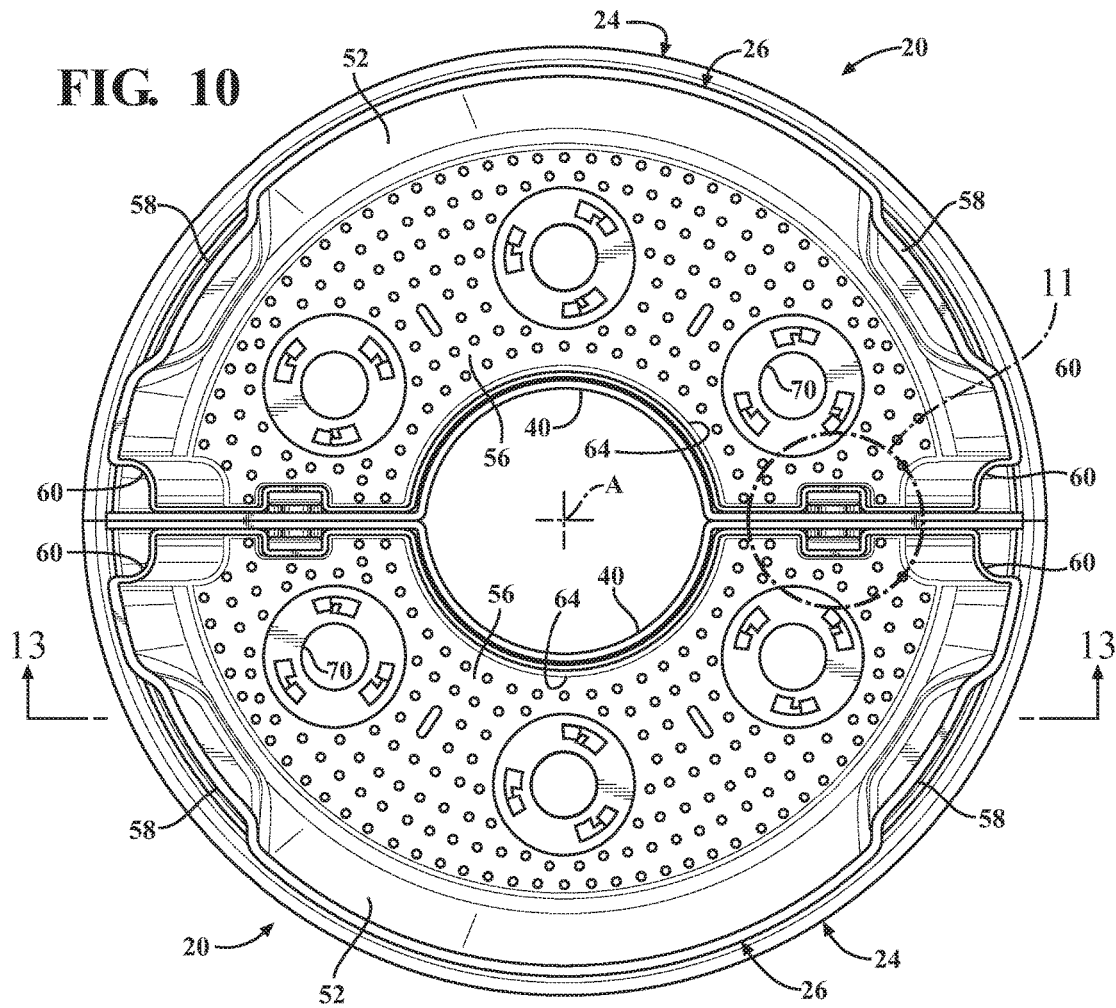
FIG. 10 is a top view of the paired planter assemblies shown in FIG. 9.
Figure 11:
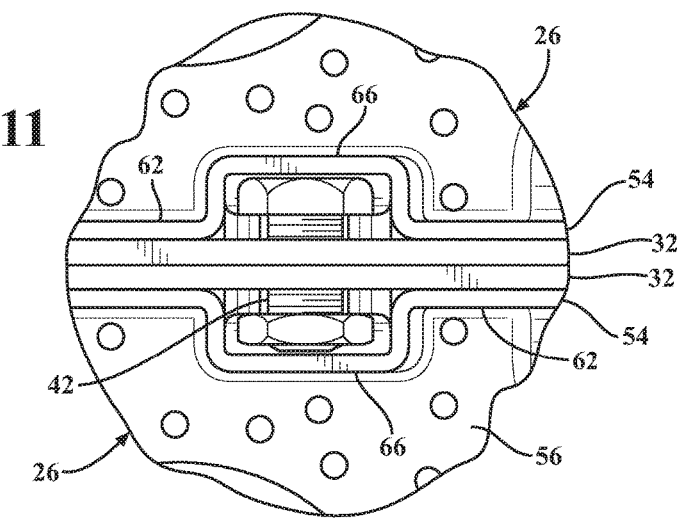
FIG. 11 is an enlarged view of the area circumscribed at 11 in FIG. 10.

FIGS. 9 and 10 depict two assemblies 20 attached back-to-back to form a full circular shape akin to a traditional plant pot or container. The present invention can be use in this manner, i.e., as a paired set of assemblies 20, when applications permit such as mounting to a light pole 22. For pole and/or wall mounting applications, a bracket 82 is provided as shown in FIGS. 12-16. That is to say, the bracket 82 is useful for attaching the assembly 20 at an elevated location via a supporting pole 22 or wall (not shown).

The bracket 82 includes a sill plate 84 configured to underlie the bottom 34 of the shell 24. The sill plate 84 includes a pair of slots 86 that are arranged in parallel with one another. The slots 86 are configured to align with the connector fittings 50 under the bottom 34 of the shell 24. In other words, bolts (not shown) can be passed through the slots 86 in the sill plate 84 and threaded into the connector fittings 50 to securely affix the bracket 82 to the shell 24. The elongated nature of the slots 86 allows the bracket 82 to be adjusted in and out so that poles 22 of larger or smaller diameter can be accommodated. See FIG. 12. The sill plate 84 further includes a notch disposed in a rearward edge thereof to provide clearance for a pole 22. A flange 88 extends downwardly from the rearward edge of the sill plate 84, and includes a plurality of fastener holes 90. An elongated bolt 92 (FIG. 12) is placed in one hole 90 on each side of the flange 88 to clamp against a pole 22. A pressure bar 94 extends downwardly from the sill plate 84 and from the flange 88. The pressure bar 94 has an elongated V-shaped configuration and is adapted to apply a clamping force to the exterior surface a support pole 22 when the elongated bolts 92 are tightened. The bracket 82 may optionally include an angle brace 96 that extends between the pressure bar 94 and the sill plate 84 to increase structural rigidity. In cases of mounting a single assembly 20 to the face of a vertical wall, several lag bolts (not shown) can be anchored through the holes 90 in the flange 88.

Figure 17:
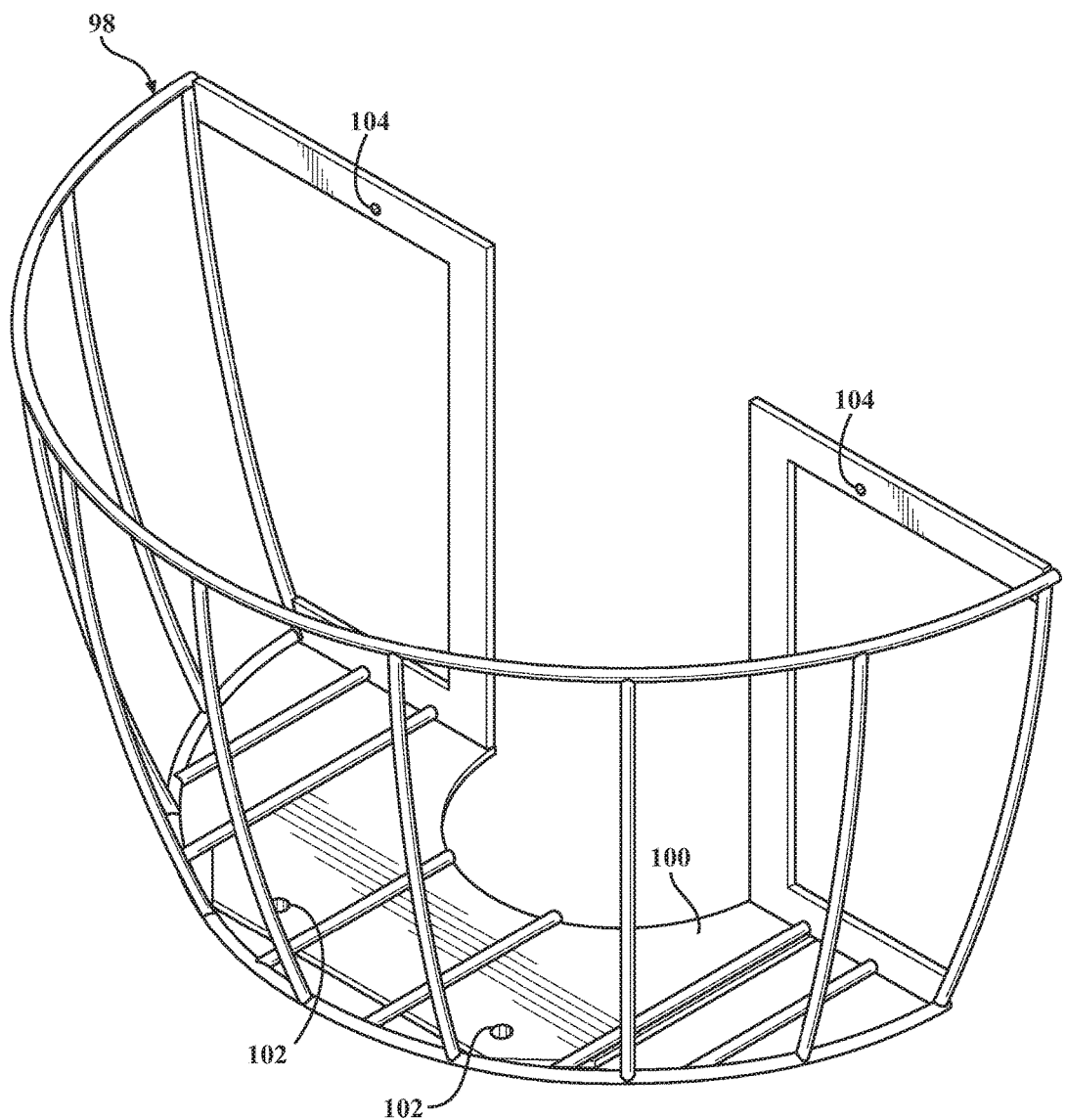
FIG. 17 is a perspective view of the optional cladding basket.

As shown in FIGS. 1, 16 and 17, a decorative cladding basket 98 may be used to render the traditional appearance of a hanging basket. The cladding basket 98 envelopes the shell 24, and includes a base 100 fitted with base attachment holes 102 that are aligned with the connector fittings 50 in the bottom 34 of the shell 24. In this manner, bolts can be used to securely attached the cladding basket to the shell 24 either with or without concurrent use of the bracket 82. Furthermore, the cladding basket 98 includes rear holes 104 that are aligned with the fasteners 42 in the abutment sections 38 of the shell 24. In situations where cladding baskets 98 are used with two assemblies 20 paired back-to-back, the threaded bolt features of the fasteners 42 pass through the rear holes 104 in the two abutting cladding baskets 98. Alternatively, when mounting a single assembly 20 to the face of a vertical wall, several lag bolts (not shown) can be anchored through the rear holes 90 either with or without the above-mentioned use of a bracket 82.

The assembly 20 of this invention provides an improved plant container for a variety of elevated mounting options including pole, wall applications, as well as ground placement options. The assembly 20 can be used singularly in its basic half-round configuration or paired back-to-back with a like assembly 20 to create a full-round visual impression. When two assemblies 20 are paired back-to-back, they can be mounted at an elevated location on a light pole 22 to create an aesthetically symmetrical and weight balanced system that is more securely stable than prior art hanging planter systems, and that is capable of holding a large amount of water and delivering that water to the plant at an optimized rate without over-saturating the soil. The present invention is versatile enough to permit non-pole elevated mounting applications (i.e., wall mounts) with little-to-no modifications.

The novel wicking units 28 of this invention provide sturdy structural support for the heavy soil insert 26. The design of the wicking units 28 provides superior stability for the soil insert 26, maximizes the water reservoir space by enabling a reduced volume of the conical body portion, and reduces the overall weight of the planter assembly 20. As such, the present invention is more adaptable for elevated mounting applications, such as the pole mounted configuration shown in FIG. 1.

Figure 12:
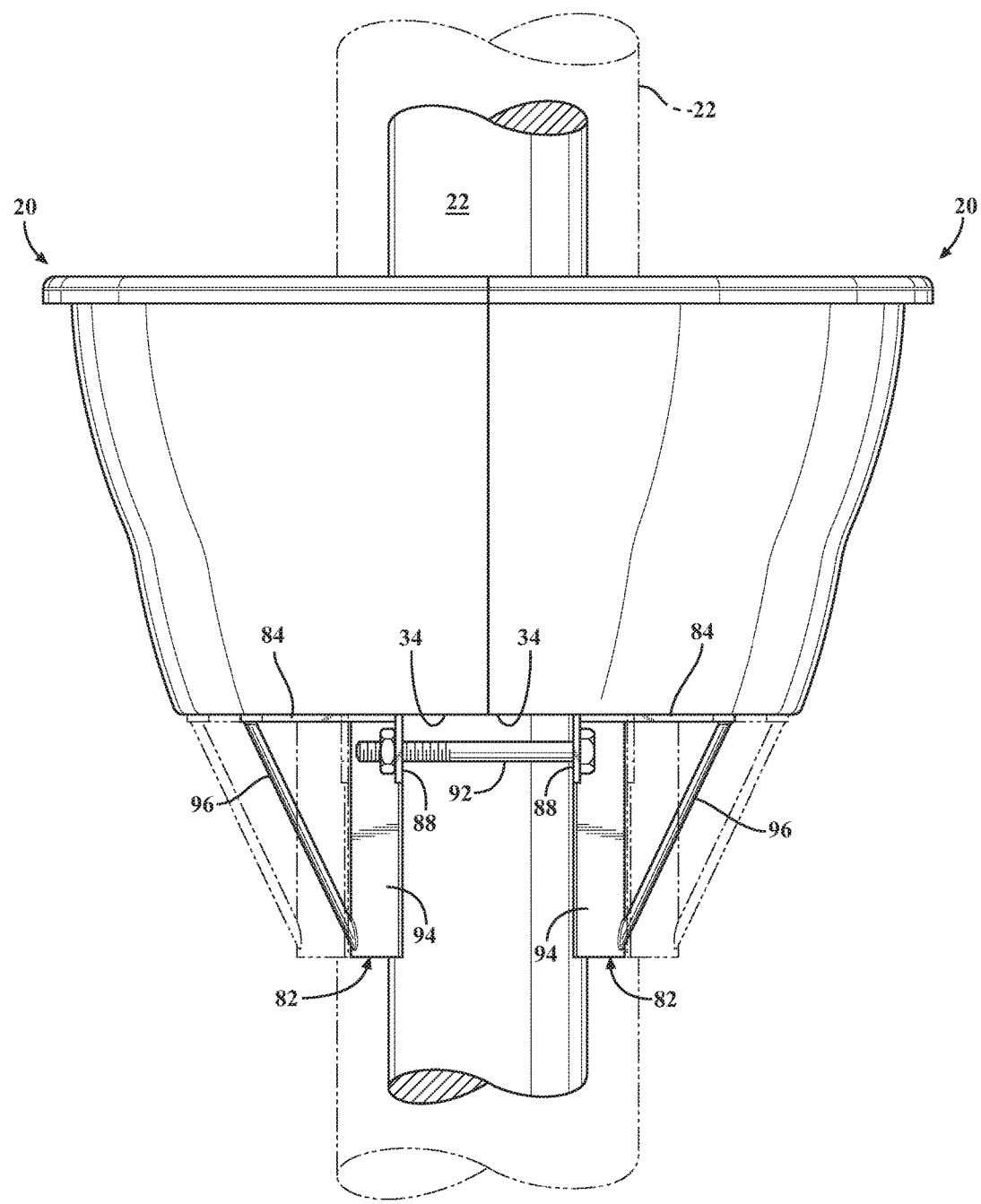
FIG. 12 is a simplified view, in side elevation, showing a pair of planter assemblies attached back-to-back and clamped to a small diameter light pole using a bracket feature of the present invention, and where a larger diameter light pole is shown in phantom lines with appropriate adjustment of the bracket features.

Other advantages include one or more overflow ports 44 that prevent oversaturation of the potting soil, and a novel bracket 82 that can be used to clamp the bottom of the assembly 20 directly to the shaft of a pole 22. The bracket 82 is adaptable to various pole 22 diameters by using several holes 90 and nuts and bolts 92, as depicted in FIG. 12. An optional iron cladding basket 98 can be included to provide the appearance of a more traditional wire basket.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. A plant container assembly comprising:
   a shell forming an outer receptacle having an open top, said shell having a front wall and a back wall and a bottom, said back wall including a pair of abutment sections separated by a semi-cylindrical indentation, each of said abutment sections including at least one fastener adapted to connect to an adjacent structure,
   a soil insert removably nested within said shell, said soil insert forming an interior receptacle having an open top substantially filling said open top of said shell, said soil insert having an anterior wall and a posterior wall and a permeable floor, said posterior wall including a pair of co-planar sections separated by a semi-cylindrical bulge, said permeable floor including a plurality of wicking attachments, each said wicking attachment surrounding a soil hole,
   a wicking unit selectively attachable to each of said wicking attachments of said soil insert, each said wicking unit having a mounting flange, said mounting flange having an opening aligned with said soil hole to permit the passage of loose soil therethrough, each said wicking unit having a generally conical body extending downwardly from said mounting flange to an apical tip, at least one elongated slit disposed in said conical body of said wicking unit, and each said wicking unit including at least one external rib extending from said body,
   wherein said back wall includes at least one overflow port, said overflow port having an opening that is disposed above said bottom by a predetermined distance to automatically discharge water thereabove, a plurality of interior support pads arranged within said shell at a common elevation above said bottom, said common elevation being located above said overflow port, said interior support pads including at least one ledge extending inwardly from said back wall, said permeable floor of said soil insert resting on said interior support pads of said shell.

2. The assembly of claim 1, wherein said rib extends from said mounting flange to a terminal point past said apical tip.

3. The assembly of claim 1, wherein said at least one external rib comprises a plurality of external ribs disposed in equal circumferential increments about said body.

4. The assembly of claim 3, wherein said at least one elongated slit comprises a plurality of axially propagating slits, each said slit being disposed between two adjacent external ribs so that said ribs and said slits alternate circumferentially about said conical body.

5. The assembly of claim 1, wherein said wicking unit has an overall height and said at least one elongated slit has an axial length, said axial length of said slit being greater than 50% of said overall height of said wicking unit.

6. The assembly of claim 1, wherein each said wicking attachment includes a portion of a rotary coupling, said mounting flange including a mating portion adapted to interlock with said rotary coupling of said soil insert.

7. The assembly of claim 1, wherein said interior support pads include at least one column extending upwardly from said bottom of said shell.

8. The assembly of claim 1, wherein said front wall of said shell has a tapered semi-cylindrical shape and is generally centered about a vertical axis, said abutment sections disposed in a common plane generally bisecting said vertical axis, and said anterior wall of said soil insert is generally centered about said vertical axis.

9. The assembly of claim 1, wherein said soil insert includes at least one hand-grip disposed on the uppermost edge of said anterior wall.

10. The assembly of claim 1, wherein said anterior wall of said soil insert includes at least one filler relief.

11. The assembly of claim 10, wherein said filler relief is disposed at an intersection between said anterior wall and said posterior wall.

12. A plant container assembly comprising:
a shell forming an outer receptacle having an open top, said shell having a front wall and a back wall and a bottom, said back wall including a pair of abutment sections separated by a semi-cylindrical indentation, each of said abutment sections including at least one fastener adapted to connect to an adjacent structure,
a soil insert removably nested within said shell, said soil insert forming an interior receptacle having an open top substantially filling said open top of said shell, said soil insert having an anterior wall and a posterior wall and a permeable floor, said posterior wall including a pair of co-planar sections separated by a semi-cylindrical bulge, said permeable floor including a plurality of wicking attachments, each said wicking attachment surrounding a soil hole,
a wicking unit selectively attachable to each of said wicking attachments of said soil insert, each said wicking unit having a mounting flange, said mounting flange having an opening aligned with said soil hole to permit the passage of loose soil therethrough, each said wicking unit having a generally conical body extending downwardly from said mounting flange to an apical tip, at least one elongated slit disposed in said conical body of said wicking unit, and each said wicking unit including at least one external rib extending from said body,
a bracket for attaching said assembly to a supporting pole or wall, said bracket including a sill plate configured to underlie said bottom of said shell, said shell including at least two connector fittings opening downwardly from said bottom, and said sill plate includes a pair of slots arranged in parallel with one another, said slots configured to align with said at least two connector fittings, said sill plate including a notch disposed in a rearward edge of said sill plate, said sill plate including a flange extending downwardly from said rearward edge thereof, said flange including a plurality of fastener holes,
wherein said sill plate includes a pressure bar extending downwardly from said sill plate and said flange, said pressure bar having an elongated V-shaped configuration adapted to apply a clamping force to the exterior surface a support pole.

13. The assembly of claim 12, wherein said bracket includes an angle brace extending between said pressure bar and said sill plate.

14. The assembly of claim 12, further including a cladding basket adapted to envelope said shell, said cladding basket including a base, said base having at least two base attachment holes aligned with said connector fittings disposed within said bottom of said shell, said cladding basket further including at least one rear hole aligned with each said fastener in said abutment sections of said shell.

15. A plant container assembly comprising:
a shell forming an outer receptacle having an open top, said shell having a front wall and a back wall and a bottom, said front wall generally centered about a vertical axis, said back wall including a pair of abutment sections, said abutment sections disposed in a common plane generally bisecting said vertical axis, each of said abutment sections including at least one fastener adapted to connect to an adjacent structure, said back wall including a semi-cylindrical indentation in-between said abutment sections, said indentation being arranged in a vertical direction and configured to nest against a supporting pole structure, said semi-cylindrical indentation centered about said vertical axis, said back wall including at least one overflow port, said overflow port having an opening that is disposed above said bottom by a predetermined distance to automatically discharge water thereabove, a plurality of interior support pads arranged within said shell at a common elevation above said bottom, said common elevation being located above said overflow port, at least one connector fitting opening downwardly from said bottom, a drain hole disposed in said bottom, a plug removably disposed in said drain hole,
a soil insert removably nested within said shell, said soil insert forming an interior receptacle having an open top substantially filling said open top of said shell, said soil insert having an anterior wall and a posterior wall and a permeable floor, said anterior wall having a convex and generally tapered semi-cylindrical shape, said anterior wall generally centered about said vertical axis, at least one hand-grip disposed on the uppermost edge of said anterior wall, said anterior wall including at least one filler relief, said filler relief disposed at an intersection between said anterior wall and said posterior wall, said posterior wall including a pair of co-planar sections, said co-planar sections disposed adjacent respective ones of said abutment sections within said shell, said posterior wall including a semi-cylindrical vertical bulge in-between said co-planar sections, said bulge configured to nest about said semi-cylindrical indentation, said permeable floor resting on said interior support pads of said shell, said permeable floor including a plurality of wicking attachments, each said wicking attachment surrounding a soil hole, each said wicking attachment including a portion of a rotary coupling,
a wicking unit selectively attachable to each of said wicking attachments of said soil insert, each said wicking unit having a mounting flange, said mounting flange including a mating portion adapted to interlock with said rotary coupling of said soil insert, said mounting flange having an opening aligned with said soil hole to permit the passage of loose soil therethrough, each said wicking unit having a generally conical body extending downwardly from said mounting flange to an apical tip, said body including a plurality of axially propagating slits permeable to water but generally resistant to loose soil transit, said wicking unit having an overall height and each of said elongated slits having an axial length that is greater than 50% of said overall height of said wicking unit, each said wicking unit including a plurality of external ribs disposed in equal circumferential increments about said body, each said rib extending from said mounting flange to a terminal point past said apical tip, a bracket for attaching said assembly to a supporting pole or wall, said bracket including a sill plate configured to underlie said bottom of said shell, said sill plate including a pair of slots arranged in parallel with one another, said slots configured to align with said at least one connector fitting disposed within said bottom of said shell, said sill plate further including a notch disposed in a rearward edge thereof, a flange extending downwardly from said rearward edge of said sill plate, said flange including a plurality of fastener holes, a pressure bar extending downwardly from said sill plate and said flange, said pressure bar having an elongated V-shaped configuration adapted to apply a clamping force to the exterior surface a support pole, and a cladding basket adapted to envelope said shell, said cladding basket including a base, said base having at least one base attachment hole aligned with said at least one connector fitting disposed within said bottom of said shell, said cladding basket further including at least one rear hole aligned with each said fastener in said abutment sections of said shell.

\* \* \* \* \*